(12) United States Patent
Buckingham

(10) Patent No.: US 7,127,554 B2
(45) Date of Patent: Oct. 24, 2006

(54) WRITING DATA TO A STORAGE MEDIUM IN DATA SETS COMMENCING AT A SAME POSITION ALONG THE STORAGE MEDIUM

(75) Inventor: Jonathon Peter Buckingham, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 338 days.

(21) Appl. No.: 10/745,936

(22) Filed: Dec. 29, 2003

(65) Prior Publication Data

US 2004/0168024 A1    Aug. 26, 2004

(30) Foreign Application Priority Data

Dec. 27, 2002   (GB) ................................ 0230192.7

(51) Int. Cl.
*G06F 12/00*    (2006.01)
(52) U.S. Cl. ........................... 711/111; 711/4; 711/100; 711/112; 711/154
(58) Field of Classification Search ................ 711/111, 711/4, 100, 112, 154
See application file for complete search history.

(56) References Cited

U.S. PATENT DOCUMENTS

| | | | | |
|---|---|---|---|---|
| 5,247,508 A | * | 9/1993 | Tanaka ................... | 369/112.17 |
| 6,125,427 A | * | 9/2000 | Oeda et al. .................. | 711/111 |
| 6,198,876 B1 | | 3/2001 | Iwasaki et al. ............... | 386/95 |
| 6,295,177 B1 | * | 9/2001 | Bickers et al. ................ | 360/48 |
| 6,378,007 B1 | * | 4/2002 | Southwell ...................... | 710/1 |

FOREIGN PATENT DOCUMENTS

EP        0 469 931        2/1992

\* cited by examiner

*Primary Examiner*—Stephen C. Elmore

(57) ABSTRACT

Data are written to plural parallel data tracks of a data storage medium by arranging a data stream into plural streams of data sets. Each stream of data sets is allocated to a corresponding respective group of parallel data tracks. A plurality of the data sets are written to the plural data track groups, such that in each data stream, each data set commences at substantially the same position along a length of the linear data storage medium, as a data set of another of the streams.

21 Claims, 13 Drawing Sheets

Data Set

| | 0 | 1 | 2 | 3 | 4 | | 463 | 464 | 465 | 466 | 467 |
|---|---|---|---|---|---|---|---|---|---|---|---|
| 0 | 0 | 1 | 2 | 3 | 4 | | 463 | 464 | 465 | 466 | 467 |
| 1 | 468 | | | | | | | | | | |
| . . . | | | | | | | | | | | |
| 52 | 24804 | 24805 | 24806 | 24807 | 24808 | | 25267 | 25268 | 25269 | 25270 | 25271 |
| 53 | | | | | | | | | | | 24803 |

Fig. 6

| Track 0 | 0 | 9 | 18 | 27 | 36 | 45 | 54 | 63 | 64 | 73 | ... | 448 | 457 | 466 | 475 | 484 | 493 | 502 | 511 |
|---|---|---|---|---|---|---|---|---|---|---|---|---|---|---|---|---|---|---|---|
| Track 1 | 1 | 10 | 19 | 28 | 37 | 46 | 55 | 56 | 65 | 74 | ... | 449 | 458 | 467 | 476 | 485 | 494 | 503 | 504 |
| Track 2 | 2 | 11 | 20 | 29 | 38 | 47 | 48 | 57 | 66 | 75 | ... | 450 | 459 | 468 | 477 | 486 | 495 | 496 | 505 |
| Track 3 | 3 | 12 | 21 | 30 | 39 | 40 | 49 | 58 | 67 | 76 | ... | 451 | 460 | 469 | 478 | 487 | 488 | 497 | 506 |
| Track 4 | 4 | 13 | 22 | 31 | 32 | 41 | 50 | 59 | 68 | 77 | ... | 452 | 461 | 470 | 479 | 480 | 489 | 498 | 507 |
| Track 5 | 5 | 14 | 23 | 24 | 33 | 42 | 51 | 60 | 69 | 78 | ... | 453 | 462 | 471 | 472 | 481 | 490 | 499 | 508 |
| Track 6 | 6 | 15 | 16 | 25 | 34 | 43 | 52 | 61 | 70 | 79 | ... | 454 | 463 | 464 | 473 | 482 | 491 | 500 | 509 |
| Track 7 | 7 | 8 | 17 | 26 | 35 | 44 | 53 | 62 | 71 | 72 | ... | 455 | 456 | 465 | 474 | 483 | 492 | 501 | 510 |

Fig. 8

WRITING DATA TO A STORAGE MEDIUM IN DATA SETS COMMENCING AT A SAME POSITION ALONG THE STORAGE MEDIUM

FIELD OF THE INVENTION

The present invention relates to the field of data storage, and particularly although not exclusively, to a method for writing data to a data storage medium, to a write channel, to a method of writing a plurality of data streams, to a method of reading data from a data storage medium, and to a read channel.

BACKGROUND TO THE INVENTION

Prior art tape data storage devices write 8 separate physical tracks in parallel as a tape data storage medium is drawn past a write head. Eight separate write heads are simultaneously used for writing data, and 8 read heads are simultaneously used for reading back data stored on the tape data storage medium.

Referring to FIG. 1 herein, there is illustrated schematically a prior art arrangement for writing 8 physical tracks of data simultaneously in parallel, and for reading 8 physical tracks of data simultaneously in parallel from a linear tape data storage medium.

The prior art read/write arrangement comprises a host computer 100 which supplies data to a tape read/write head 101 via a write channel, and which receives data read back from the tape head via a read channel; an interface component 102 for interfacing with the host computer, the interface component implemented as an integrated circuit chip comprising an SCSI protocol engine, a burst buffer, and a burst manager component; a formatter component 103, the formatter component comprising a logical formatter 104 and a physical formatter 105; and a main buffer memory 106 for temporarily storing blocks of data to the tape read/write head; a signal processing component 107 which is downstream of the formatter component in the write channel; and a pre-amplifier component 108 which amplifies signals prior to writing onto a tape data storage medium via the tape write head 101, and which processes signals read from the read head 101 in the other direction, as they are read back from the tape, before they are input into the formatter.

Referring to FIG. 2 herein, there is illustrated schematically in plan view an array of 8 read/write elements arranged in a read/write head, along with 8 physical data tracks recorded on an elongate linear tape data storage medium. The read/write elements are capable of being electronically converted to either read data from a physical data track, or write data to a physical data track. Each read/write element comprises a read head and a write head, and depending upon the direction of the tape and whether a read or write operation is being carried out, the read part of the read/write element or the write part of the read/write element is active, whilst the remaining part of the read/write element is de-activated. Therefore, each read/write element is capable of being electronically controlled to perform either a read operation or a write operation. The tape data storage medium can move in either of a first direction or a second direction relative to the read/write elements, as shown by the arrowhead in the figure. When writing data in a first direction A, the tape moves in the first direction A relative to the read/write head, and data is written by a first plurality of write elements in a first column 200 and the written data is immediately re-read by a first plurality of the read elements in a second column 201, which follow the write elements.

When writing in a second direction B, the first row of write elements 200 can be electronically converted to read components, and the second column 201 of read components are electronically configured to be write components. In this case, writing of data is performed by the second column of write components and re-reading of the written data is performed by the first column 200 of read components.

To improve the performance of the prior art devices, it is desirable to improve the read and write speed from a read/write head onto a tape data storage medium.

There is the issue of how to increase the data transfer rate for writing to and reading from a tape data storage medium for product. Since the prior art devices have a tape speed past the read/write heads of over 4 meters per second, increasing the tape speed any further in order to increase the data transfer rate is technically difficult.

SUMMARY OF THE INVENTION

According to a first aspect there is provided a method of writing data to a data storage medium, said method comprising: arranging data into a plurality of streams of data sets; allocating each said stream of data sets to a corresponding respective group of a plurality of data tracks; and writing said data sets to said data track groups of said data storage medium, such that in each said data stream, each data set commences at a substantially same position along a length of said data storage medium, as a data set in each other said stream of data sets.

Other aspects according to the present invention are as defined in the claims herein, and the scope of the invention is limited only by the features as recited in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 6 illustrates schematically a sub-data set, a plurality of said sub-data sets comprising a data set;

FIG. 8 illustrates schematically an allocation of sub data sets to physical data tracks, for a single data set written to a single group of data tracks;

DETAILED DESCRIPTION OF A SPECIFIC MODE FOR CARRYING OUT THE INVENTION

There will now be described by way of example a specific mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
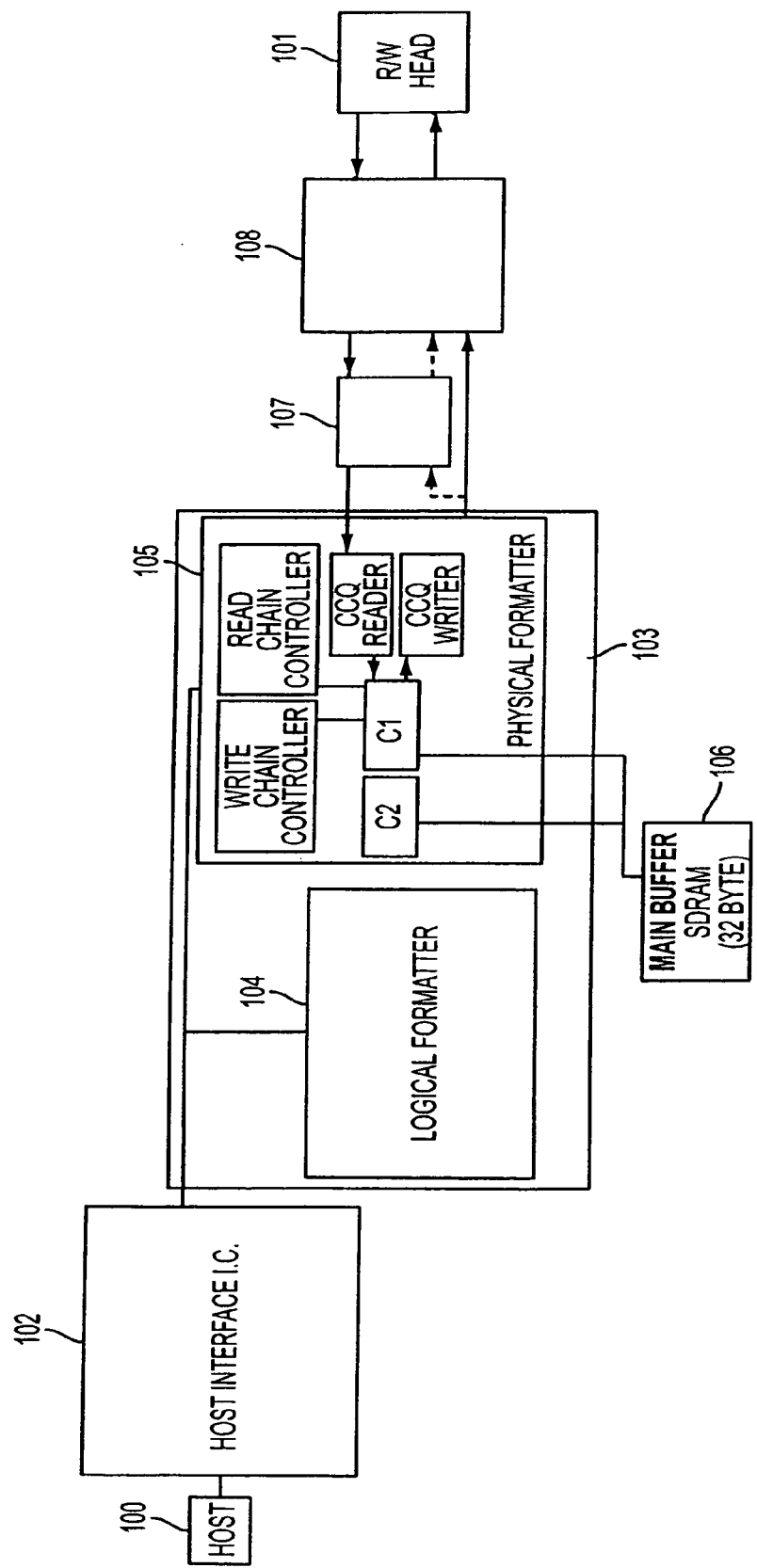
FIG. 1 illustrates schematically a prior art read/write device for reading and writing 8 physical data tracks in parallel to a linear tape data storage medium.
Figure 2:
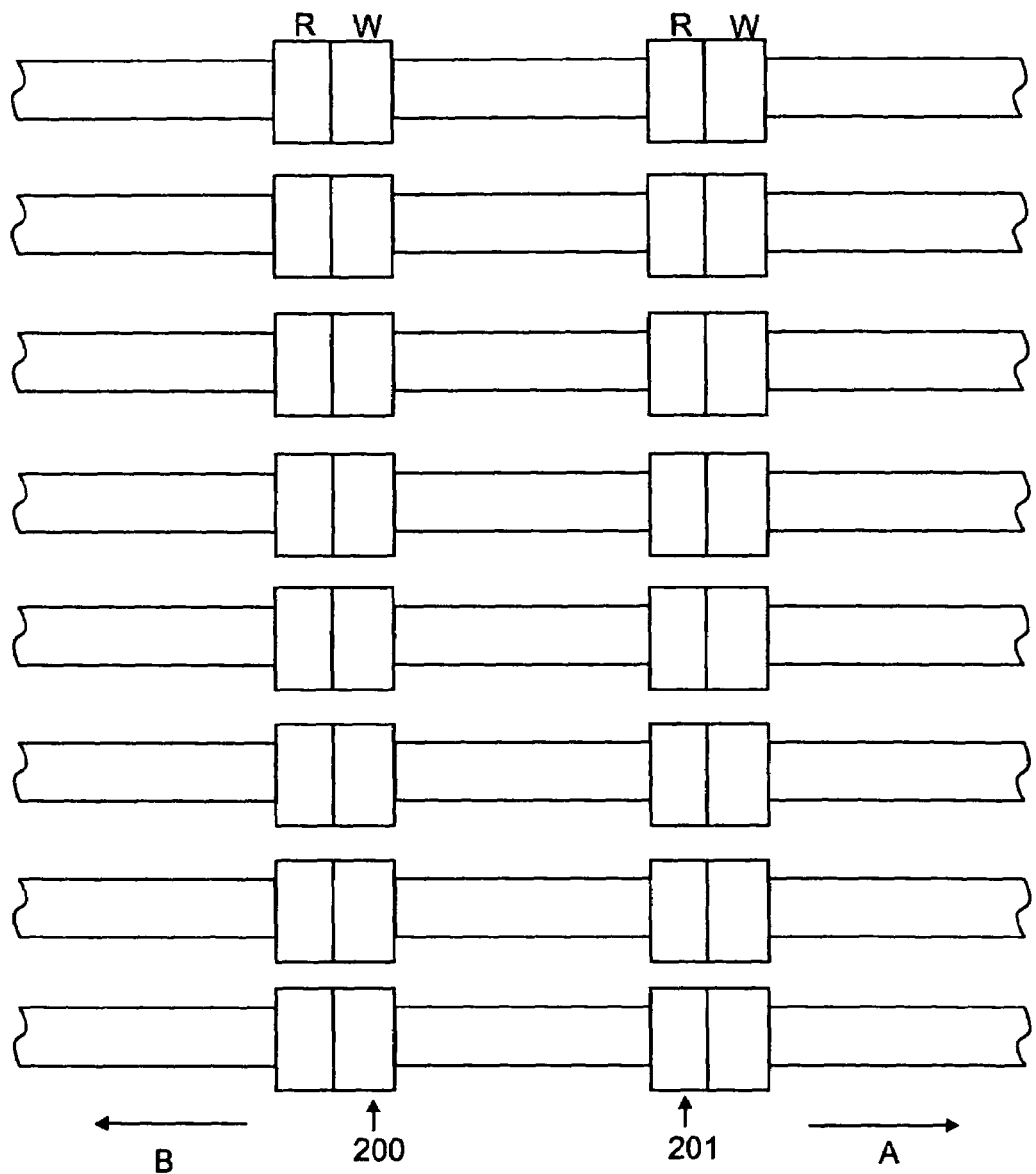
FIG. 2 illustrates schematically a layout of a prior art read/write head capable of reading to and writing from 8 physical tracks in parallel and having two columns of read/write components.
Figure 3:
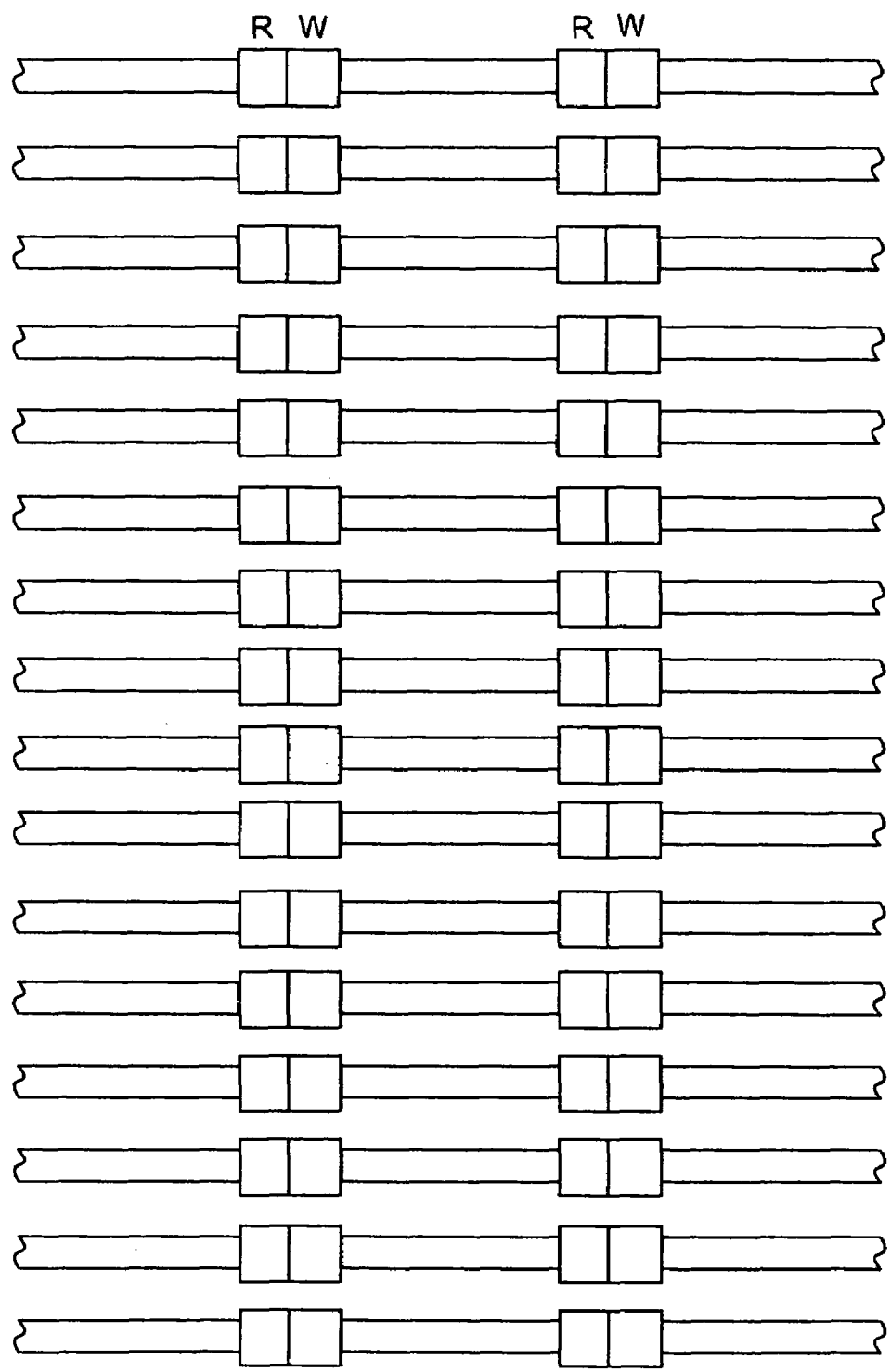
FIG. 3 illustrates schematically a read/write head of a read/write circuit according to a specific implementation of the present invention, capable of reading to and writing from 16 physical data tracks in parallel, and having 32 individual read/write components arranged in two parallel columns.

Referring to FIG. 3, there is shown schematically an array of read/write elements writing in a plurality of physical tracks, to a tape data storage medium, according to a specific embodiment. In the specific embodiment, a set of physical tracks which are written at the same time in parallel by the array of 16 rows of read/write elements are separated from each other, so that other physical tracks of different sets are present between individual physical tracks of a same set. The high number of tracks (16 tracks) is accommodated by writing narrower tracks.

The amount of physical tracks which are written to simultaneously is 16, Similarly, the number of read channels is 16, inputting signals from 16 read heads which read data from 16 physical tracks on the tape data storage medium.

A servo motor moves the read/write head across the tape, to align the read/write elements with different sets of physical tracks across the tape, so that as sequential longitudinal passes or "wraps" of data are made, the heads follow an overall serpentine path over the tape. Physical tracks can be written in either a first, forward direction, or in a second, reverse direction as the tape passes the read/write head.

Figure 4:
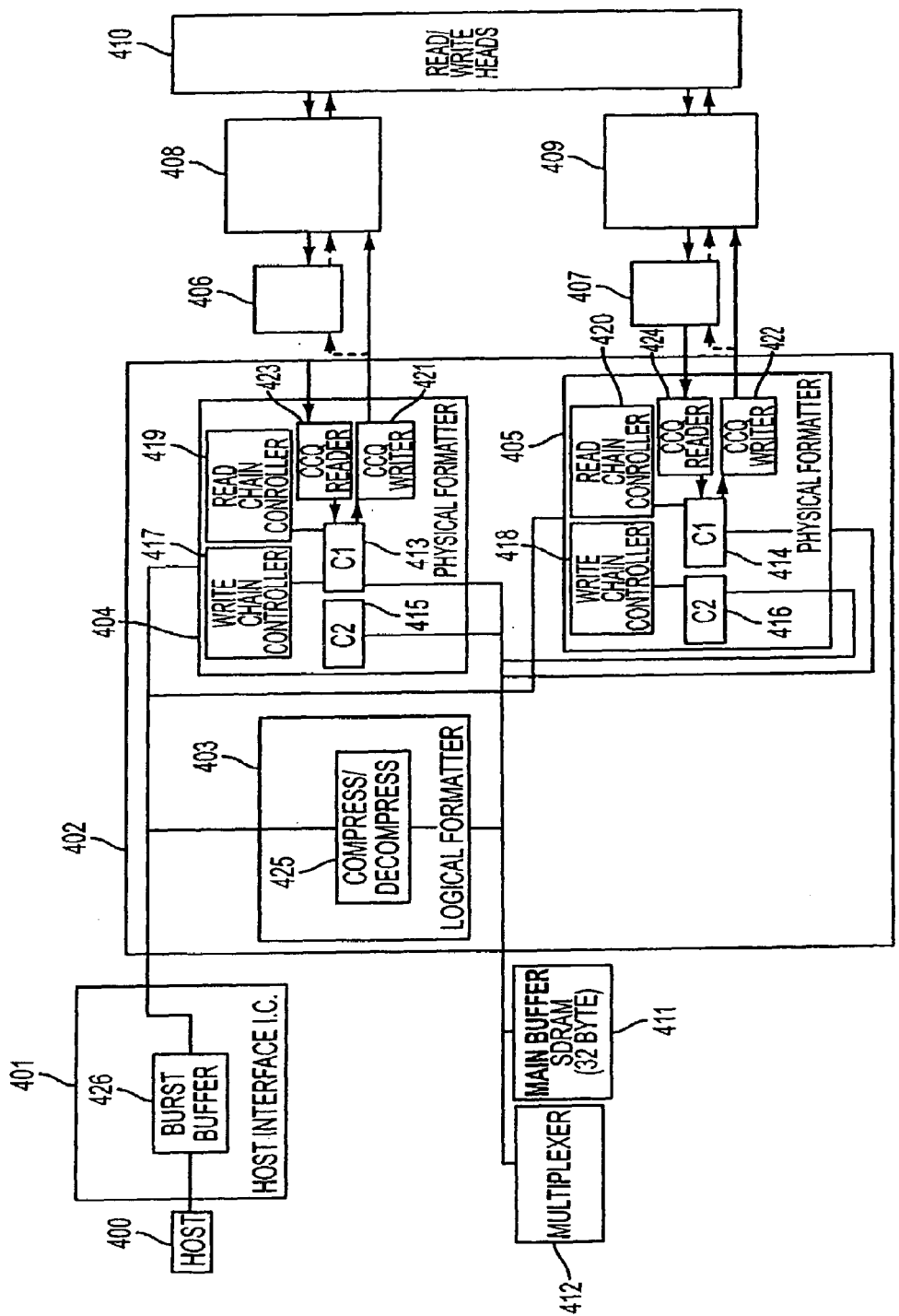
FIG. 4 illustrates schematically a read/write channel according to a specific implementation of the present invention, capable of reading to and writing from 16 parallel physical tracks.

Referring to FIG. 4 herein, there is illustrated schematically a read/write controller according to a specific implementation of the present invention, having 16 bi-directional read/write channels for reading and writing 16 physical tracks in parallel onto a tape data storage medium.

The controller interfaces with a host computer 400. The controller can operate in a read mode in which data is read back from the tape and supplied to the host computer. The controller can also operate in a write mode, in which the host computer writes data to the controller, which writes the data in physical tracks on the tape.

The controller comprises: a host interface component 401; and a formatter block 402. The host interface comprises a burst buffer. The formatter block comprises a logical formatter 403 and two physical formatters 404, 405; two digital signal processors 406, 407; two analog pre-amplifiers 408, 409; a read/write head 410; a main buffer memory 411; and a multiplexer 412. The formatter block may be implemented as an application specific integrated circuit, but the invention is not limited to this form of implementation.

Each physical formatter comprises a C1 encoder/decoder 413, 414 respectively, a C2 encoder/decoder 415, 416 respectively; a write chain controller 417, 418 respectively; a read chain controller 419, 420 respectively; a code word quad writer 421, 422 respectively and a code word quad reader 423, 424 respectively.

The logical formatter comprises a compression and decompression engine 425. The host interface comprises a burst buffer 426.

In a write mode, the controller operates as follows. Referring for simplicity to only one of the physical formatters, the other formatter operates similarly. Data comes in from the host computer in fast bursts. Typically the records are of 64 kB. Data is written to the burst buffer. The main purpose of the burst buffer is to hide the high burst rate from the rest of the controller architecture. The burst buffer smooths out the burstiness of the data arriving at the host interface and compression engine to achieve a more continuous speed, i.e. continuous data rate. Data exits the burst buffer at a slower rate, is compressed by the compression engine, and written as data sets into the main buffer.

Data sets exit the main buffer and are received by the physical formatter 404. The C2 formatter 415 adds a parity to protect the data. The data is written back into the main buffer. The C1 encoder/decoder 413 then takes data from the main buffer, checks the C2 parity for corruption, and sends it to the codeword quad CCQ writer for further formatting.

The write chain controller controls the C1 parity and handles all data set level controls including read and write retries. The CCQ writer encodes the data set to limit the run lengths of 1's and 0's, and also adds synchronization fields.

The CCQ writer sends data to the digital signal processor and analog pre-amplifier components. Write equalization can be performed in either the formatter 404, or in the digital signal processor 406.

Whilst writing, the read elements of the read/write head closely follow the write elements. The data picked up from the read elements of the read/write head 410 is digitized by the digital signal processor 406, which may be implemented as a separate application specific integrated circuit, (ASIC), and is analyzed by the write chain controller for errors. If the number of errors exceeds a threshold level of errors, then the data is rewritten by means of read while write (RWW) retries.

In a read mode, the controller operates as follows. For simplicity of explanation, only one formatter 404 is described. The other formatter(s) operate(s) similarly.

Read operations are similar to write operations in reverse. The read chain controller handles data set level control.

Data is picked up from the tape by the read head and passes through the analog pre-amplifiers into the digital signal processors. Digital data is written into data set locations in the main buffer. The data passes through the CCQ reader 423. This involves sniffing for synchronization fields, recognizing data set boundaries, ignoring drop ins, and coping with missing data. If any defects in the digital read data can be corrected, then the data is de-compressed, and written into the burst buffer. An SCSI protocol engine in the host interface sends the bursts from the burst buffer to the host computer.

Figure 5:
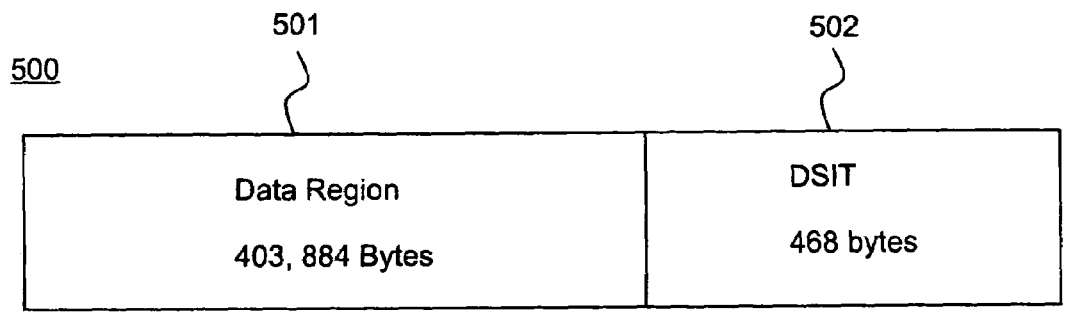
FIG. 5 illustrates schematically a data set represented as a sequence of data bytes, representing a basic unit of data which is written to and read from tape according to specific methods of the present invention.

Referring to FIG. 5 herein, there is illustrated schematically an example of a data set. The skilled reader will appreciate that variation on the size and structure of data sets may be made. In this example, each data set is approximately 500 kBytes. The data set is a self contained unit, and all C1, C2 error correction codes are confined to a single data set. Each data set comprises 16 sub-data sets.

A data set comprises of two parts. The first part is a data region 501 having 403, 884 bytes. The content of the data region is dependant upon the type of data set being recorded. The second part of the data set is a data set information table (DSIT) 502 having 468 bytes. The information in the DSIT describes the content of the data region. For all types of data set, data is placed in the data region and the DSIT is appended to form the 404, 352 byte data set. The information in the DSIT is not processed during data compression. Within a data set, the bytes are identified by number, with the first byte in the data set being byte 0, and the last byte being byte 404, 351.

Referring to FIG. 6 herein, there is illustrated schematically construction of a sub-data set. The first sub-data set is filled by placing the first data set byte into row 0, column 0 of the sub-data set and continuing as shown to fill out in the same manner the whole of the sub-data set. Subsequent sub-data sets for the same data set are filled out in a similarly mannered order. A sub-data set is a basic data unit processed by the error correction code algorithm. The sub-data set contains 25, 272 bytes organized as 54×468 bytes matrices. 16 sub-data sets are constructed from each data set.

Figure 7:
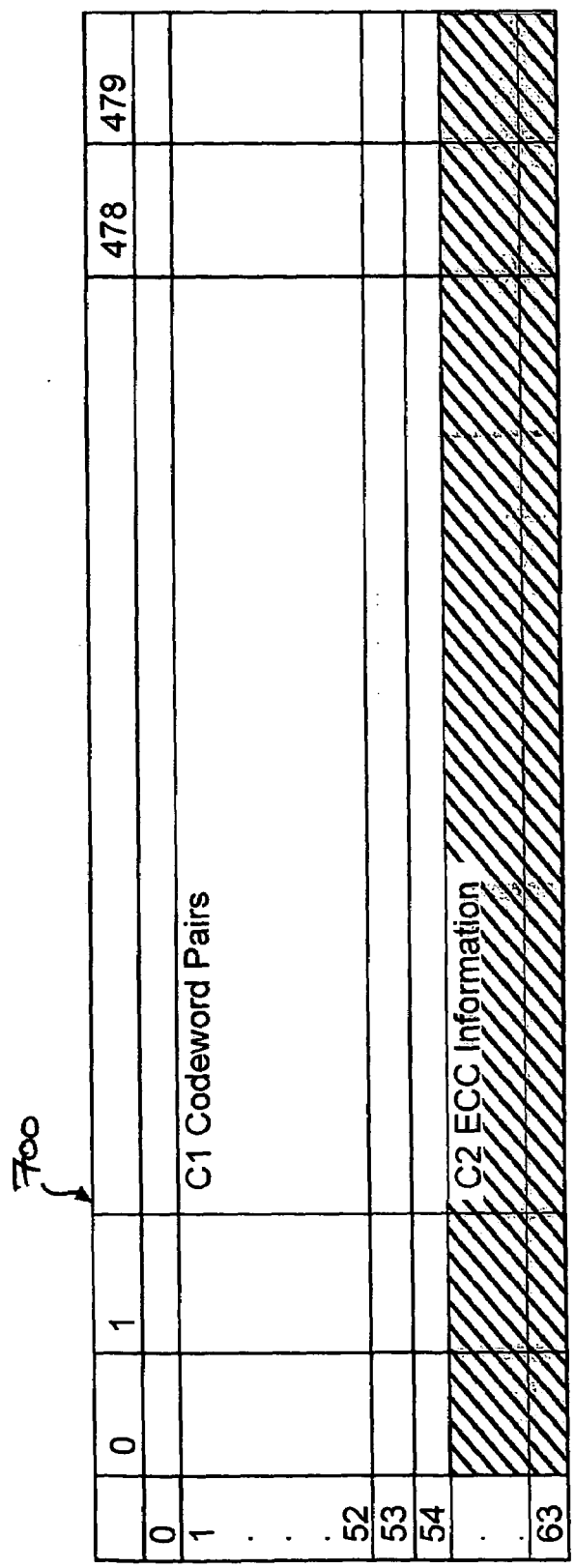
FIG. 7 illustrates schematically an error correction coded sub data set.

Referring to FIG. 7 herein, there is shown in more detail an error correction coded sub data set 700. A sub data set is the basic data unit processed by an error coding correction algorithm. A sub data set can be viewed as two levels of error correction C1, C2 in a matrix, where C1 correction is performed on rows, and C2 correction on columns. Coding application in the write channel is performed in the formatter component.

Referring to FIG. 8 herein, there is illustrated schematically allocation of physical write channels to physical tracks along a tape for writing 8 data sets in parallel across 8 physical tracks. For each data set, code word quads are written simultaneously onto the tape in sets of 8 code word quads, where 8 is the number of concurrent active tracks for one data set. One code word quad of each set is written to each of the 8 tracks. Tracks are numbered 0 through 7 for the first data set, where logical 0 through 7 correspond to the physical tracks that are defined to be in a current wrap in numerically ascending order. Similarly, tracks numbered 8 through 15 correspond to logical tracks 8 through 15 for the second data set, that are defined in a current wrap in numerically ascending order. A 'wrap' is a passage from one end of a linear tape data storage media to another in a single direction. Logical track 0 corresponds to the lowest numbered physical track in the first data set and logical track 7 corresponds to the highest numbered physical track in the first data set. Logical track 8 corresponds to the lowest numbered physical track in the second data set and logical track 15 corresponds to the highest numbered physical track in the second data set. In each data set, code word quad sets are numbered 0 through 63.

Figure 9:
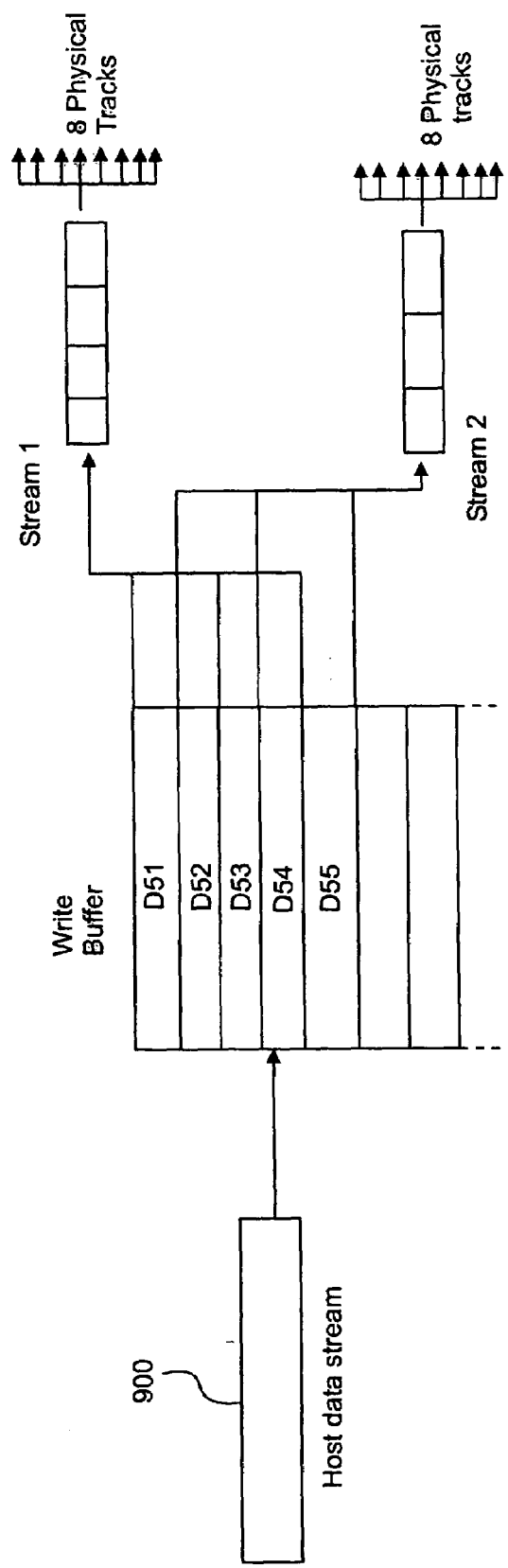
FIG. 9 illustrates schematically a data flow diagram for writing data within a write channel according to a specific method for the present invention.

Referring to FIG. 9 herein, there is illustrated schematically data flows in the controller of FIG. 4 herein, during a write mode.

A host data stream 900 is input into the buffer after being divided into a plurality of data sets. In an implementation having 2 write data streams, alternate data sets are written to the first and second physical formatters, by the multiplexer, so that the first data stream comprises odd numbered, ie, first, third, fifth and so on data sets, and the second data stream comprises even numbered, ie, second, fourth, sixth and so on data sets. Each data stream is allocated to 8 physical data tracks, where 8 physical data tracks comprise a group of data tracks. The first data stream is written to a first group of data tracks, and the second data stream is written to a second group of data tracks. The first and second groups of data tracks are written in parallel on the linear tape data storage medium. In each of the first and second groups of data tracks, a new data set in the first group is commenced at a same position along the length of tape as a new data set in the second group.

Figure 10:
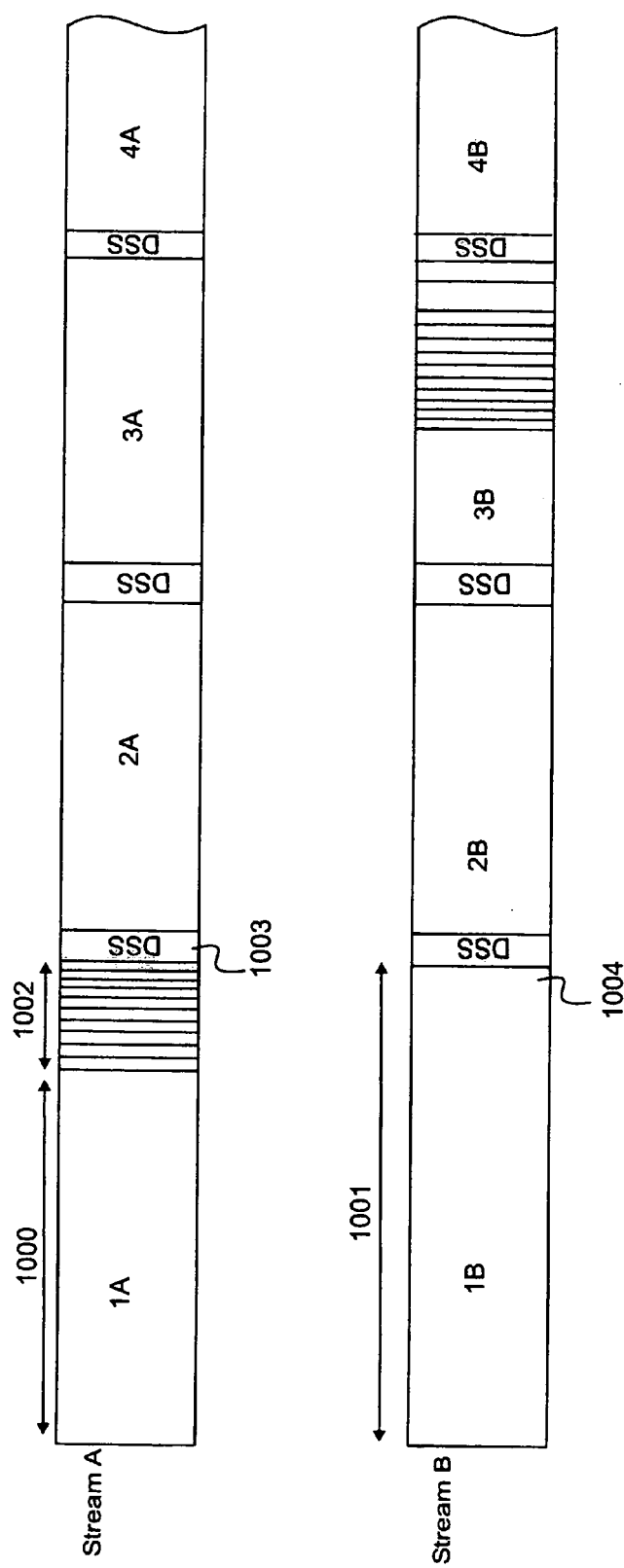
FIG. 10 illustrates schematically a pair of data sets written in parallel to a linear tape data storage medium according to a specific implementation of the present invention.

The issue of mismatch of writing data sets and the approach taken is illustrated schematically with reference to FIG. 10 herein.

Referring to FIG. 10 herein, the formatter component works out on which track within a data set to place specific code word quads for that data set.

Two data sets are written in parallel, the first data set across tracks 0–7 and the second data set across tracks 8–15, as the tape proceeds past the write head during a write operation.

By writing and reading data as two parallel sets, this enables backward compatibly with previous generation products, so that data written by previous generation products can still be read by the novel controller as shown in FIG. 4 herein by reading through 8 of the parallel tracks at once.

Two streams of data sets are written in parallel, each along 8 physical tracks of a linear tape data storage medium, each data set written in parallel occupying 8 physical tracks. Once it is physically written to tape, each data set is self-contained and independent of each other data set in the same stream, and is independent of a parallel data set written on a parallel set of 8 physical tracks.

One physical formatter component is used to write each data set so that, two data sets are written in parallel, each formatted by its own corresponding respective write formatter. Coding and interleaving of code word quads across physical data tracks is carried out within the physical formatter component.

For allocation of data sets between the first and second physical formatters, there is provided a multiplexer, so that at any one time either the first physical formatter or the second physical formatter is receiving data from the main buffer. The multiplexer handles requests for access to the main buffer from the logical formatter, the first physical formatter, and the second physical formatter, by controlling the data-bus. Each of the formatters has a request line onto the bus and access to the bus is controlled by the multiplexer. The multiplexer may comprise part of the main buffer and performs the function of arbitration of usage of the bus and access to the main buffer.

However, duplicating the two physical formatters to write data sets in parallel causes a further issue as follows. If there are media defects, so that data written along a set of physical tracks cannot be properly recovered, then a re-write of data needs to occur. Defects can occur either in the first set of physical data tracks, i.e. in the first data set stream, or in the second set of physical data tracks, i.e. in the second data set stream.

If either the first data stream or the second data stream experiences an error within that data stream, then portions of the data set need to be re-written. Consequently, if there is a issue in writing either data stream, which involves re-writes, then the physical distance along the tape occupied by a data set in one stream can exceed the physical distance occupied by the parallel data set occupied in the other data stream.

This situation is shown in FIG. 10, where the data set 1B, which has experienced several re-writes, occupies a greater distance than the parallel data set 1A in the first data stream.

There is an issue in synchronizing the physical positions of parallel data sets written in the first and second data streams, so that as the tape moves past the write head, parallel data sets do not become out of synchronization over an extended length of tape.

The issue is addressed as shown in FIG. 10, by keeping individual data sets of the first and second data stream in step with each other so that they each physically start at the same distance along the tape as each other.

In FIG. 10, each block 1A, 1B, 2A, 2B, 3A, 3B represents a data set written over 8 parallel physical tracks. Data sets are written in parallel pairs 1A, 1B; 2A, 2B; ... respectively. Each data set in a pair begins at a same position along a length of the tape.

In the example shown, a first pair of data sets 1A, 1B commences being written at the same time. The first data set experiences no writing problems, and therefore occupies a first length 1000 along the tape. The second data set of the pair, 1B experiences writing problems, and therefore experiences re-writes, so that the total length of the second data set including re-writes is longer than that of the first data set 1A. The first data stream A writes padding data 1002 until the second data stream has finished writing the second data, including re-writes. The padding data may be implemented as including amble CQ sets or by including repeated data set separator (DSS) fields. At the end of each data set, there is written a DSS block 1003, 1004 respectively.

Ambles comprise codeword quad sets which are used as padding between the end of the first data set, to fill a plurality of data tracks in a data group until position at which a new data set in the same data stream commences to be written. Amble CQ sets are ignored on reading.

In practice, in an example of a system having two streams of data sets, the occurrence of rewrite tries is low enough that the unutilized amount of physical data storage space on a group of data tracks which is occupied by padding data amounts to less than 1% of the total bytes written to the data storage medium.

A data set comprises 64 codeword quads (CQ), and when a read while write re-try occurs, codeword quad sets are rewritten. Therefore, when written to the data storage medium, a minimum data set may have 64 CQ sets. However, if there are any re-tries, then a maximum data set written to the data storage medium may be up to three times that amount, ie 128 CQ sets. In practice, most written data sets will be 64 CQ sets, with a few data sets having some extra rewritten CQ sets. During writing, each CQ set is checked immediately after being written, and any rewrites of CQ sets are made as soon as possible after detecting an error. Each data stream is treated independently for checking of written CQ sets, and applying any CQ set rewrites.

At the end of each data set, including any padding data which is included, a data set separator (DSS) is written. Each group of data tracks has written its own corresponding respective data set separator, therefore, each data stream has its own data set separator, and a plurality of data set separators of a plurality of data streams are written at a same position across the physical data storage medium.

The multiplexer sends alternate data sets to each of the plurality of physical formatters. In the case of FIG. 4, two physical formatters are shown, and the multiplexer alternates allocation of subsequent data sets between the first and second physical formatters. The multiplexer does not write any more data to the first physical formatter until the second physical formatter has completed writing the previous data set, and vice versa, the multiplexer does not write any new data set to the second physical formatter until the first physical formatter has completed writing its previous data set.

In the general case of a controller capable of writing a plurality of data streams in parallel, the multiplexer arranges for reading of consecutive data sets from the buffer memory to consecutive physical formatters in sequence, such that a first data set is written to a first physical formatter, a next, second data set is written to a next, second physical formatter, a next, third data set is written to a next, third physical formatter, and so on until a data set has been written to each physical formatter. When a data set has been written to each physical formatter, the multiplexer cycles back to the first physical formatter and allocates the next and subsequent data set to the first physical formatter, allocating consecutive further data sets to the other physical formatters in sequence.

As the linear tape data storage medium moves past the write heads, a plurality of data streams are written in parallel, such that interleaved pairs of data sets per data stream are written at the same time. The multiplexer operates to interleave codeword quad pairs of successive consecutive first and second data sets within the first data stream, and similarly interleaves third and fourth data sets within the second data stream, writing the two pairs of data sets in parallel along the two sets of write elements. For two data sets written simultaneously, each having 1024 codeword quad pairs, the parallel streams before multiplexing will be:

$$A^0, A^1, A^2, A^3, A^4, \ldots A^{1023}$$

$$B^0, B^1, B^2, B^3, B^4, \ldots B^{1023}$$

The multiplexer will fetch a stream in the order:

$$A^0, B^0, A^1, B^1, A^2, B^2, \ldots A^{1023}, B^{1023}$$

Interleaving reduces the amount of buffering.

In any particular data stream, a further data set is not written until all data sets for all data streams have finished writing, at which point a new plurality of data sets commenced to be written at the same time across a plurality of corresponding respective groups of physical data tracks, so that at all positions along the linear tape data storage medium, a line of data sets are commenced to be written at a same position along the length of the linear tape data storage medium in a single write wrap.

Figure 11:
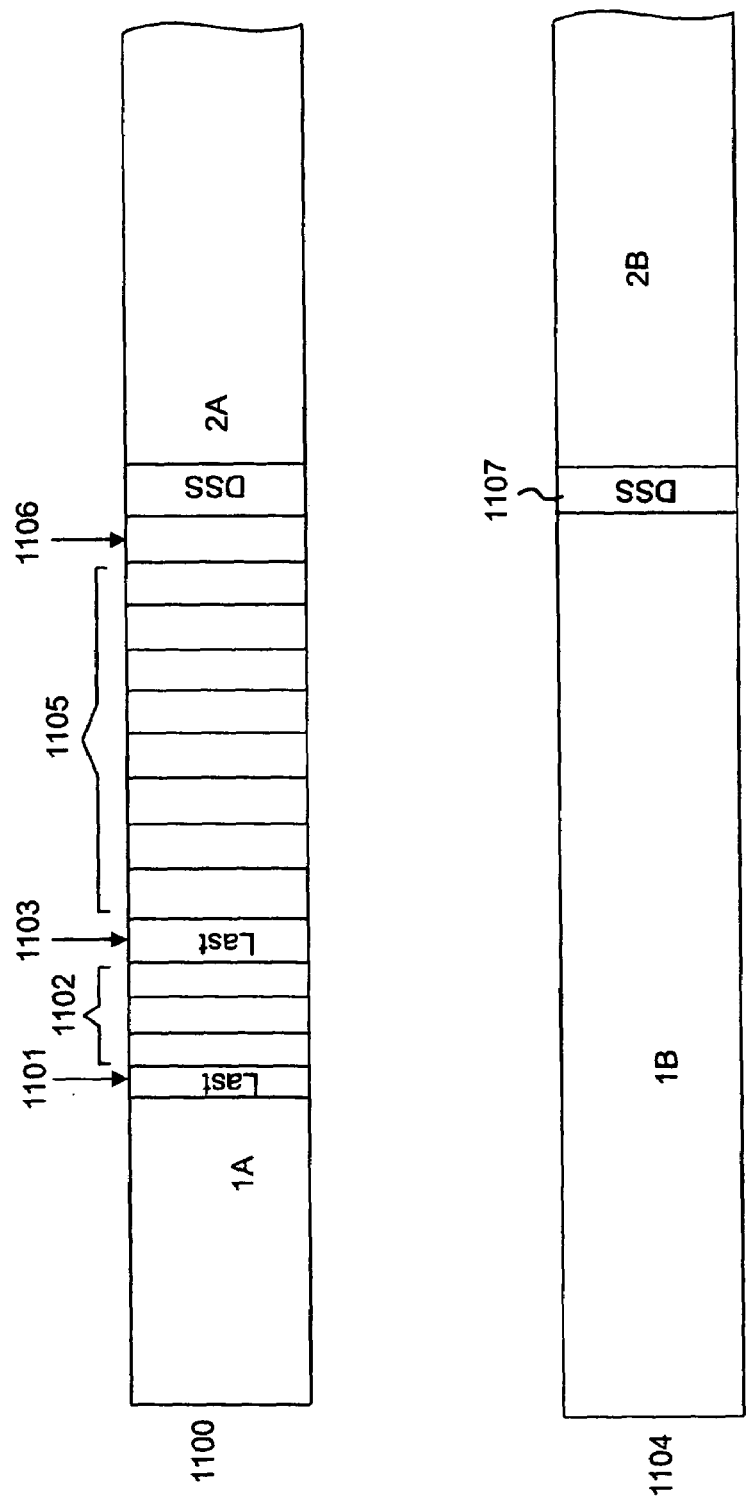
FIG. 11 illustrates schematically in more detail, termination of a data set by a last CQ set, containing an end of data field.

Referring to FIG. 11 herein, there is illustrated schematically in more detail, writing of a data set in a first data stream 1100. A data set 1A is completed, with a last codeword quad 1101. On writing the last codeword quad of the data set, because of the latency within the write channel, due to the fact that the read head follows the write head during writing, and because there is a time delay between writing and reading after the end of writing the last codeword quad of a data set, a small number of amble CQ sets, for example 3 amble CQ sets 1102 are written, before writing a data set separator field (DSS) 1104 and a subsequent data set, to allow time for checking of the data set to check for any read while write operations. Within the last CQ set is written an end of data (EOD) field, which designates that the CQ set is the end of a data set. In the example of FIG. 11, second write channel 1104 experiences re-writing of data, due to writing errors, and therefore extends longer than the first data set 1A. Until the second data set 1B in the second data stream 1104 has completed writing, the first write channel writes amble CQ sets after the last CQ set, until the data set separator fields 1106, 1107 are written. Therefore, in the first data stream 1100, one or more amble CQ sets 1105 are written.

Alternatively, instead of writing amble CQ sets, a plurality of data set separator (DSS) fields may be written, and DSS fields are preferred to amble CQ sets. DSS fields denote the start of a new data set, but can also be used to provide padding data.

On reading the data written in the first data stream shown in FIG. 11, the data which is input into the main buffer includes the data set 1A including the last data codeword quad 1101. The amble codeword quad sets 1102, 1105 and the data set separator 1106 are filtered out during reading and do not form part of the data stored in the main buffer during a read operation. Further, any rewrites of CQ sets which may be read from the tape are not duplicated, since the read channel replaces the original incorrectly written codeword quad sets with their rewrite counterparts, to reform the logical data set in the main buffer.

During reading, the best version of a rewritten CQ set is selected, ie the version with the least number of errors, and this is used to reformulate the data set, so there are only every 64 CQ sets in each logical data set stored in the main buffer.

In the first data stream 1A, after writing of the last CQ set 1101 of the first data set 1A, either amble CQ sets 1105, or DSS fields 1106 could be written, until the point where the second data set, including any rewrites, has finished writing. The selection of amble CQ sets, or DSS fields is an implementation specific detail. In either case, the function of the amble CQ set, or DSS fields, is to pad out the written data with data which will be ignored during reading, until the start of a new pair of data sets in the pair of data streams.

However, the commencement of writing of the second data set 2A in the first data stream is held off until the first data set 1B of the second data stream has finished writing, including any rewrites, so that the second data set 2A in the first data stream and the second data set 2B of the second data stream can commence writing at the same time and at the same position along the linear tape data storage medium. It is advantageous to write data set separator fields instead of amble bytes to pad out data in any stream, since this incurs minimum redesign of the physical formatters.

Figure 12:
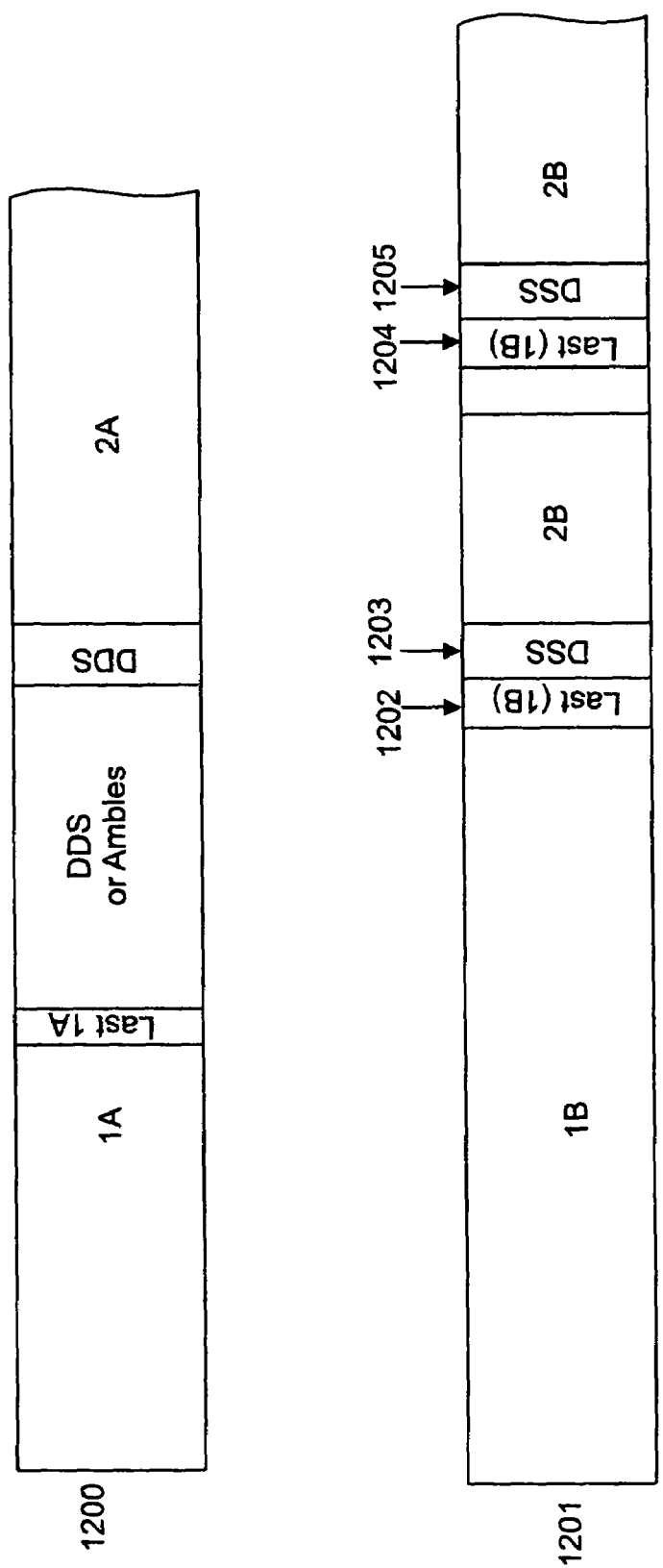
FIG. 12 illustrates schematically a situation where parallel data sets are commenced to be written at the same position on tape, and after termination of two parallel written data sets, an error in a last codeword quad set of one data set is found.

Referring to FIG. 12, there is illustrated schematically a further situation which can arise in which at the end of writing a physical data set in a second data stream 1201, a last CQ set 1202, which is the final last CQ set which is written in the first physical data set 1B in the second stream is incorrectly written. Because of a latency, ie time delay, in processing data written through the read head for checking of errors in the written CQ sets, by the time an error is detected in the last CQ set 1202, the write head may have moved on and may have written a data set separator field 1203, and commenced writing a few of the first CQ sets of a second data set 2B in the second data stream.

In the preferred embodiment, the latency within the write channel is of the order of a distance of 3 CQ sets on physical tape data storage medium. However, in other embodiments, the latency may be up to 7 or 8 CQ sets length.

If it is determined that the last CQ set 1202 of the first data set in the second data stream was incorrectly written, and the second write channel has commenced writing a second data set 2B, then the second data set is terminated, and the last CQ set of the first data set 1B of the second data stream 1204 is rewritten. At this point, writing of the first data set 1B in the second data stream is fully complete, and a further data set separator 1205 is written to signify the end of the first data set 1B. The second data set 2B in the second data stream then commences writing.

Consequently, in the example shown in FIG. 12, the second data sets in each of the first and second data streams commence writing at the same time and at the same position on the linear tape data storage medium, however one of those data sets, 2B, may need to be subsequently interrupted in order to include some outstanding data from the previous first written data set 1B in that data stream. In the general case, where a plurality of data sets are written in a plurality of data streams, writing of all the data sets commences at substantially a same position along a length of linear tape data storage medium.

A read operation of a plurality of data sets written to a plurality of groups of data tracks using the controller of FIG. 4 will now be described.

Referring again to FIG. 4, on reading a plurality of data streams in parallel, the plurality of read heads read a plurality of groups of data tracks, to input a plurality of parallel data streams, each data stream comprising a sequence of data sets within that data stream. The data sets as read immediately from the physical data tracks include amble CQ sets, or DSS fields, which are used to pad out the ends of individual data sets. In each read data stream, DSS fields and amble CQs are stripped out of the data sets, and any read while write retries are consolidated, such that in each data stream, only complete data sets are input into the main buffer. The logical formatter reads the data sets from the main buffer and constitutes a single data stream, from the plurality of input data streams, which can be then sent to a host computer. On reading, the formatter also has to determine from the written physical tracks for each data set, the order of code word quads, in order to reconstruct a data set.

Figure 13:
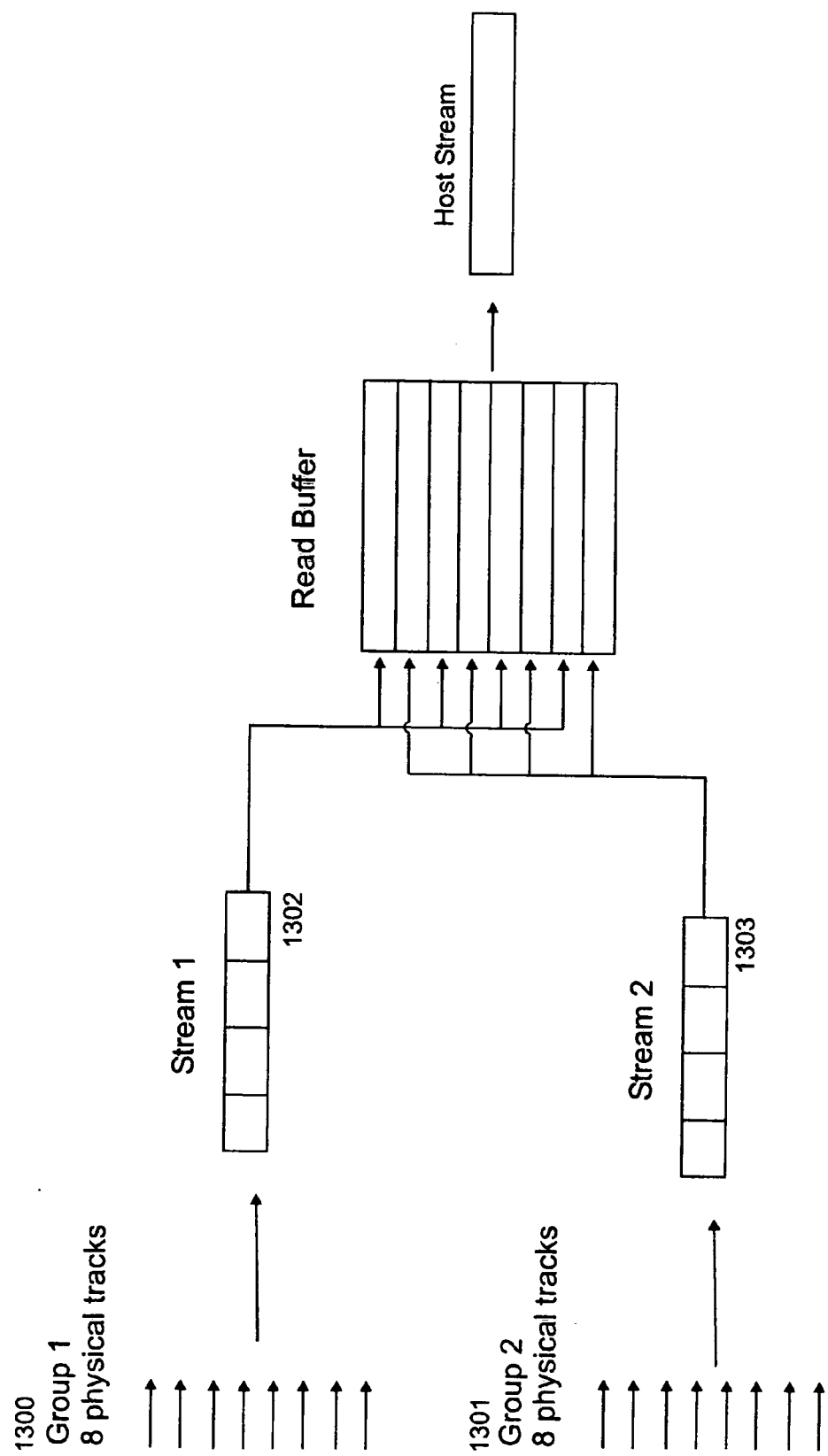
FIG. 13 illustrates schematically data flow in a read channel for reading a plurality of data streams from a plurality of groups of data tracks in parallel according to a specific method of the present invention.

Referring to FIG. 13 herein, there is illustrated schematically a data flow within the read channel for reading a plurality of groups of data tracks in parallel. A first group of physical data tracks 1300 and a second group of physical data tracks 1301, each comprising 8 physical data tracks read in parallel, are input into first and second physical formatters respectively, and comprise first and second data streams 1302, 1303 respectively. The physical formatters format the physical data tracks into data sets, so there are first and second streams of data sets. The first and second streams of data sets are alternately read into the buffer at alternate locations. The read buffer is output in real time as a host data stream, reconstituted from the first and second data streams. Alternate data sets from the first and second data streams are read out of the buffer, to reformulate the original host data stream.

Specific implementations may achieve a doubling of data transfer rate compared to prior art read/write channels to a data storage medium, whilst minimizing technical re-design of circuitry and minimizing performance bottlenecks which arise through duplication of a read/write channel. Specific implementations may have the advantage of backward compatibility with previous prior art linear tape data storage devices for enabling reading of data written through a prior art write channel.

In the above specific implementations, there is replicated a writing a set of of physical tracks in parallel in complete data sets. However by writing in parallel to two sets of data tracks, (in the examples shown, 16 physical tracks altogether), there arises the issue that data sets written by a first physical formatter may become out of synchronization with data sets written by a second physical formatter. This is because data sets sometimes are written to tape with errors, which means that write re-tries of codeword quad sets need to be made to complete a data set written to tape. Therefore, over time and distance, data sets in a first set of set of parallel physical tracks can become physically separated in distance from data sets written in the second set of 8 parallel physical tracks. The specific methods and implementations described herein may overcome this separation by inclusion of padding data, and by providing that parallel data track groups commence at a same position along a length of the data storage medium.

The invention claimed is:

1. A method of writing data to a data storage medium, said method comprising:
   arranging data into a plurality of streams of data sets;
   allocating each said stream of data sets to a corresponding respective group of a plurality of data tracks;
   writing said data sets to said data track groups of said data storage medium, such that in each said data stream, each data set written commences at a same position along a length of said data storage medium as a data set in another of said stream of data sets;
   writing re-write data in at least one said group of said data tracks; and
   writing padding data in at least one other of said data track groups.

2. The method as claimed in claim 1, further comprising:
   for each said group of data tracks, writing a start field immediately prior to writing a said group of data tracks, wherein a plurality of said start fields for a plurality of groups of data tracks commence at a same position along said linear data storage medium.

3. The method as claimed in claim 1, wherein said data storage medium comprises a tape data storage medium.

4. A method of writing data to a data storage medium, said method comprising:
   arranging data into a plurality of streams of data sets;
   allocating each said stream of data sets to a corresponding respective group of a plurality of data tracks;
   writing said data sets to said data track groups of said data storage medium; and
   wherein each data set in a said stream is arranged to commence at a same position along a length of said data storage medium as a data set of another said data stream, irrespective of whether or not any re-writes occur in either said data stream.

5. A method of writing data to a data storage medium, said method, comprising:
   arranging data into a plurality of streams of data sets;
   allocating each said stream of data sets to a corresponding respective group of a plurality of data tracks;
   writing said data sets to said data track groups of said data storage medium, such that in each said data stream, each data set commences at a same position along a length of said data storage medium, as a data set in each other said stream of data sets;
   writing re-write data in at least one said group of tracks;
   writing padding data in at least one other of said data track groups; wherein
   said padding data is written up to a position on said data storage medium at which said re-write data terminates.

6. A write system for writing a plurality of physical data tracks in parallel along a data storage medium, said write system comprising:
   an interface for interfacing with a data source for receiving data into said write system;
   a logical formatter for logically formatting said received data into a plurality of streams of data sets;
   a first physical formatter for formatting a first said stream of data sets for writing each said data set of said first stream across a first group of data tracks on said data storage medium;
   a second physical formatter for formatting a second said stream of data sets for writing each said data set of said second stream across a second group of data tracks of said data storage medium, said first and second groups of data tracks being positioned in parallel with each other; and
   wherein the write system is arranged to write a plurality of padding bytes in said first group of data tracks in the event of re-write tries on said data sets of said second group of data tracks, such that said padding bytes occupy said first group of data tracks up to a position at which a new data set write operation occurs for both said first and second groups of data tracks.

7. The write system as claimed in claim 6, further comprising a write head for writing said plurality of data sets in said first and second groups of data tracks in parallel onto said data storage medium.

8. The write system as claimed in claim 6, wherein:
   said first physical formatter is arranged to write a first data stream comprising said plurality of data sets to a first group of physical tracks; and
   said second physical formatter is arranged to write a second data stream comprising said plurality of data sets to a second group of physical tracks;
   said first and second data streams each commencing writing at a same time.

9. The write system as claimed in claim 6, adapted to write a data set of a first data stream in said first group of physical tracks and to write a data set of a second data stream in said second group of physical tracks said data sets commencing at a same position on said data storage medium.

10. A method of writing a plurality of data streams in parallel, said method comprising:
    receiving a host data stream;
    arranging said host data stream into a plurality of streams of data sets;
    allocating said streams of data sets to corresponding respective groups of data tracks; and
    writing said streams of data sets in parallel to said groups of data tracks, wherein a plurality of said data sets of different said streams of data sets commence at a same position as each other along said data storage medium; and
    wherein;
    a data set of a first said data stream is of a different length to a data set of a second said data stream, written at a same time as said data set of said first data stream; and
    equalizing a difference in length between said data sets of said first and second data streams by addition of padding data to a said data set of said first or second data stream.

11. The method as claimed in claim 10, wherein each said group of data tracks comprises a stream of data sets, each said stream of data sets having a self-contained error correction coding.

12. A method of reading data from a linear data storage medium, said method comprising:
    reading a plurality of streams of data sets recorded across a corresponding respective plurality of groups of physical data tracks in which individual data sets on different said groups of physical data tracks start in parallel at the same position as each other, wherein said data sets have been recorded with additional space occupied by padding bytes; and reconstituting said plurality of streams of data sets as a single stream of a plurality of data sets, by ignoring said padding data.

13. The method as claimed in claim 12, wherein said padding data comprises at least one amble codeword quad set.

14. The method as claimed in claim 12, wherein said padding data comprises at least one data set separator field.

15. A read system for reading a data stream comprising a plurality of data sets and padding data, said read system comprising:

a read head for reading in parallel a plurality of streams of data sets from a plurality of groups of physical data tracks on a data storage medium, said read head capable of reading in parallel a plurality of data sets written on different said groups of tracks which start and finish in parallel at equivalent said physical start and finish positions as each other, including any additional space occupied by padding bytes, and including any additional space occupied by data re-writes; and a read formatter for formatting said plurality of read data sets;

wherein said formatter is arranged to remove said padding, and is arranged to reconstitute said plurality of data sets as a single data stream.

16. The read system claimed in claim 15, comprising a plurality of said formatters, each said formatter capable of reading data from a corresponding respective group of data tracks.

17. The read system as claimed in claim 15, arranged to ignore said padding data in said data stream, and thereby remove said padding data to produce a reconstituted data stream.

18. A write controller for writing data to a plurality of physical tracks of a data storage medium, said controller comprising:

at least one logical formatter operable for logically formatting data;

a plurality of physical formatters, each operable for physically formatting data into a plurality of physically formatted parallel data streams suitable for writing to a corresponding respective plurality of groups of parallel physical tracks each data stream comprising a stream of data sets;

wherein, in operation, if a said data set of a first said data stream encounters a greater number of write re-tries different to an amount of write re-tries encountered by at least one other said data set of at least one other data stream, said controller is operable for inserting a plurality of padding bytes into whichever of said data streams encounters a lesser number of re-Write bytes, such that all of said parallel written data sets, including said padding bytes, terminate at an equivalent physical position as each other.

19. The controller as claimed in claim 18, configured such that a subsequently written plurality of data sets can commence at a same position as each other along said data storage medium.

20. The controller as claimed in claim 18, wherein two streams of data sets are written in parallel to each other, each written along eight physical tracks of said data storage medium.

21. The controller as claimed in claim 18, once each data set is physically written to said data storage medium, each data set is self contained and independent of each other data set in a same data stream of the plurality of physically formatted parallel data streams and is independent of a parallel data set written on a parallel said group of physical tracks.

* * * * *